United States Patent [19]

Rayfield

[11] Patent Number: 4,470,243
[45] Date of Patent: Sep. 11, 1984

[54] COMBINE DRIVE CONTROL

[75] Inventor: James F. Rayfield, New Holland, Pa.

[73] Assignee: Sperry Corporation, New Holland, Pa.

[21] Appl. No.: 560,713

[22] Filed: Dec. 12, 1983

[51] Int. Cl.³ .................................................. A01D 69/00
[52] U.S. Cl. ...................................... 56/11.2; 56/11.7
[58] Field of Search ................. 56/11.2, 11.6, 11.7, 56/11.8, 11.3, 10.2

[56] References Cited
U.S. PATENT DOCUMENTS
4,218,864  8/1980  Allemeersch ........................ 56/11.2

Primary Examiner—Jay R. Eskovitz
Attorney, Agent, or Firm—Larry W. Miller; Frank A. Seemar; Darrell F. Marquette

[57] ABSTRACT

A control mechanism for a combine harvester is disclosed wherein the engagement and disengagement of both the main drive and the auxiliary drive reversing mechanism can be controlled from a single lever. The control lever is pivotally mounted for rotational movement about a pair of perpendicularly disposed pivot axes, one of the pivot axes being rotatable about the other axis. A pair of clutch dogs corresponding respectively to the main drive and drive reverser are engageable with the control lever and separated by a plate-like barrier to prevent a disengagement of one clutch dog and the engagement of the other clutch dog except when the control lever is in a position to effect disengagement of both drive mechanisms. An overcenter linkage is provided with the drive reverser clutch dog to hold the control lever in an engaged position without further input from the operator.

7 Claims, 14 Drawing Figures

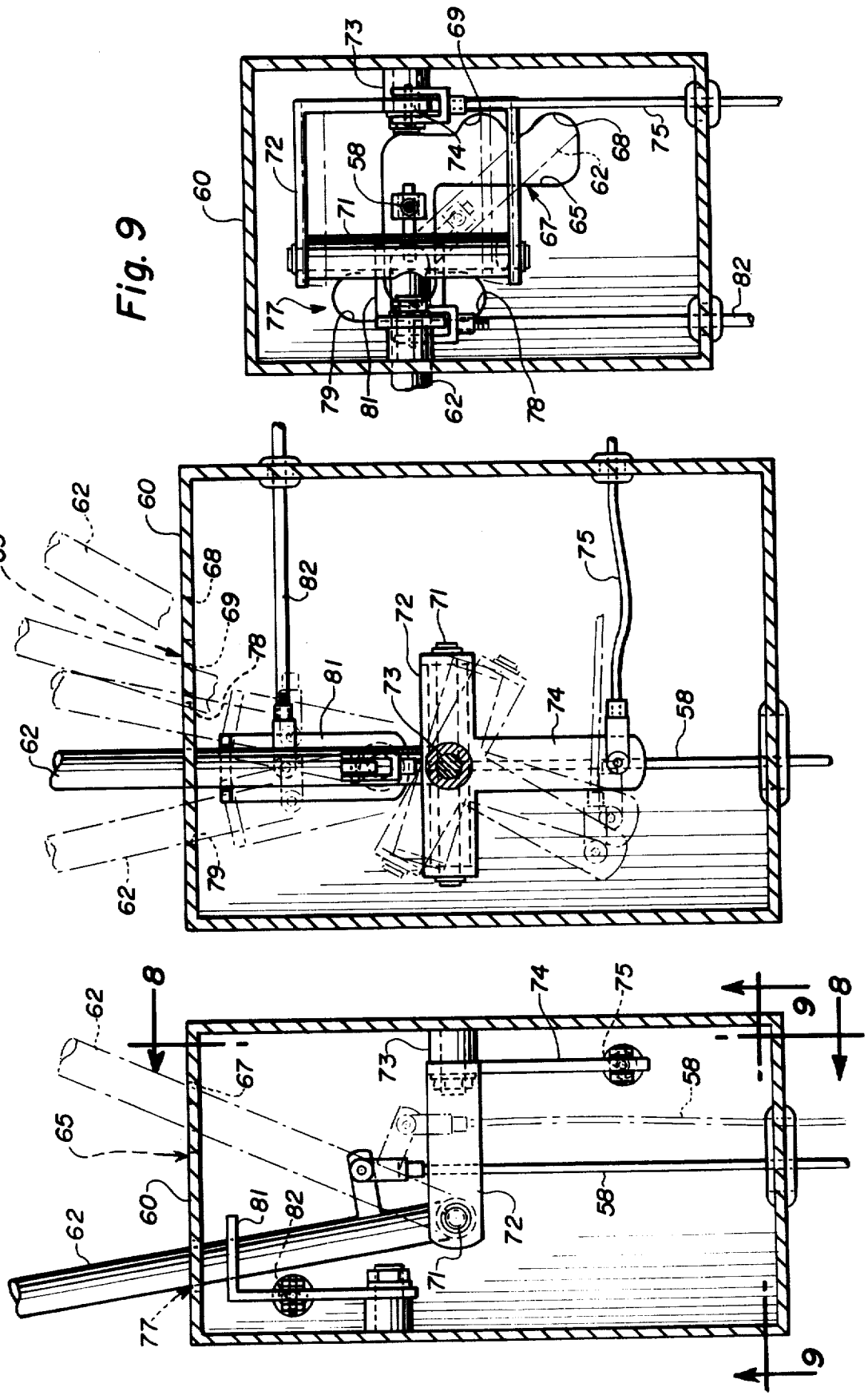

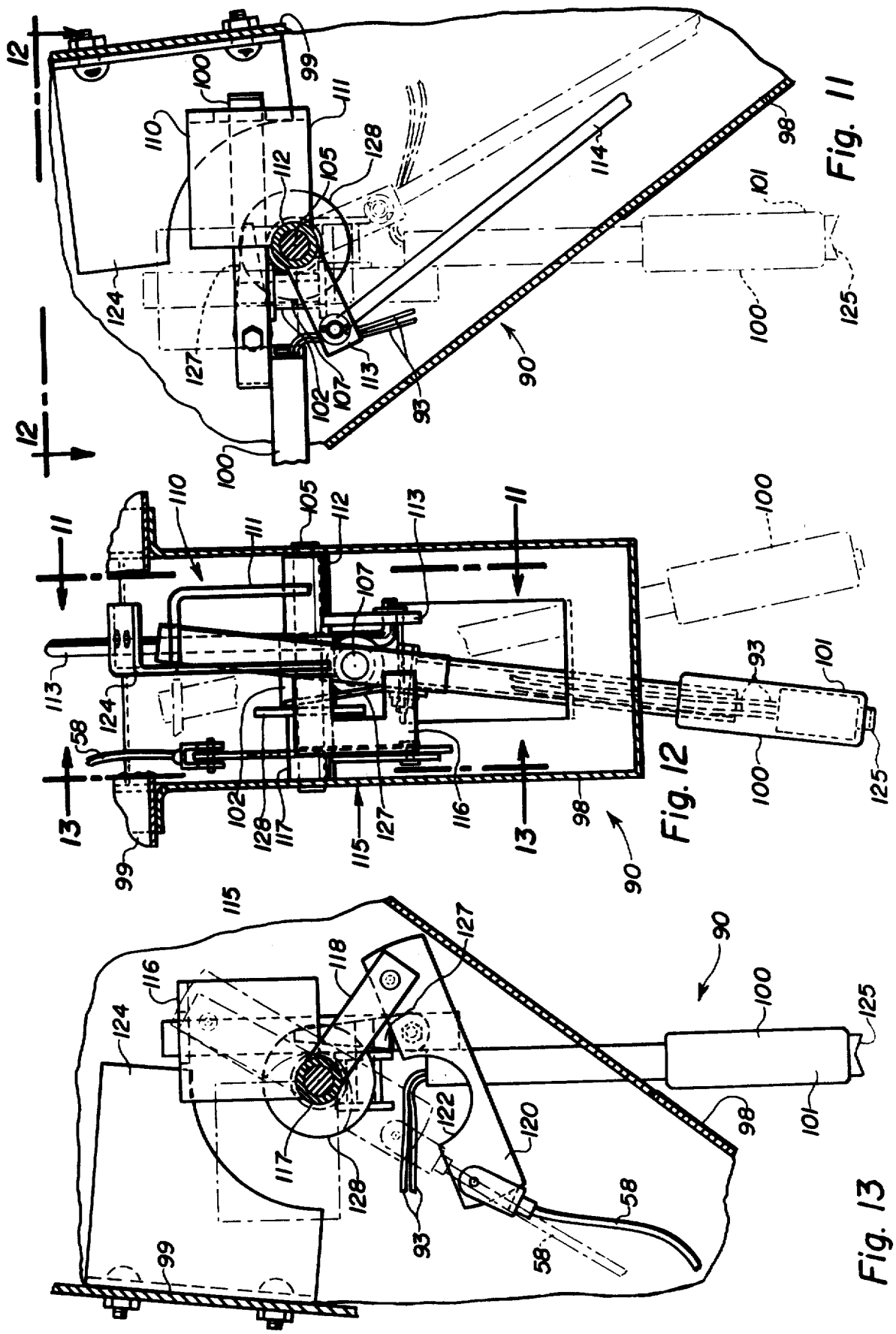

4,470,243

COMBINE DRIVE CONTROL

BACKGROUND OF THE INVENTION

The present invention relates generally to a mechanism for controlling both the main and auxiliary reversing drives to a crop harvesting header on a combine and, particularly, to a control box for actuating the header drive reversing mechanism and the primary drive by a single control lever.

Crop harvesting machines, such as combines, include harvesting mechanisms disposed on forwardly mounted headers to engage crop material on the ground and initiate the crop harvesting process. Combines are provided with conveyors housed within a hollow feeder housing to transfer severed crop material from the header to a threshing mechanism mounted in the base unit. Under certain crop conditions, one or more of the harvesting mechanisms or the conveyor can become plugged with crop material, halting the operation of the entire crop harvesting machine. By reversing the direction of the drive to these harvesting components, they can be operated in reverse to discharge the crop material toward the ground, thereby unplugging the machine in a simple and effective manner to permit a continued harvesting operation.

Examples of previous attempts to provide a header drive reversing mechanism can be found in U.S. Pat. Nos. 4,138,837 and 4,218,864. It has been found that serious damage to the drive components and/or the drive reversing mechanism can result if both the drive reverser and the primary drive are attempting to power the rotation of the header drive shaft in opposing directions at the same time. Accordingly, it would be desirable to provide an actuating mechanism that interconnects the primary drive and the drive reverser to prevent the drive reverser from being actuated while the primary drive is operatively driving the header.

SUMMARY OF THE INVENTION

It is an object of this invention to overcome the aforementioned disadvantages of the prior art by providing an actuating mechanism for a header drive reverser that is interconnected with the controls for engaging the operation of the primary drive to prevent engagement of the drive reverser while the primary drive is operatively driving the header.

It is another object of this invention to interconnect the drive reversing mechanism and the primary drive mechanism to prevent the drive reversing mechanism from attempting to reverse the rotation of the header drive shaft while being driven by the primary drive mechanism.

It is an advantage of this invention that the drive reversing mechanism cannot be actuated while the header drive shaft is being driven by the primary source of rotational power.

It is a feature of this invention that failure of the actuation linkage to the drive reversing mechanism will result in a disengagement of power for reversing the rotation of the header drive shaft.

It is still another object of this invention to control the engagement of both the drive reversing mechanism and the primary drive from a single control lever.

It is another feature of this invention that the control lever is pivotally mounted to a pivot assembly which is pivotally mounted within a control box to permit movement of the control lever in two generally perpendicular directions.

It is a further object of this invention to control the operation of the drive reversing mechanism with the same control lever controlling the engagement of both the drive reversing mechanism and the primary drive.

It is yet another object of this invention to provide a plate-like gate between clutch dogs for operating a primary drive and a drive reversing mechanism so that a control lever cannot move from one clutch dog to the other clutch except when the control lever has been moved to effect disengagement of both the primary drive and the drive reverser.

It is still another feature of this invention that an overcenter linkage is provided to hold the control lever in an engage position while controlling the drive reversing mechanism.

It is another advantage of this invention that the control lever is biased by a spring toward engagement with a clutch dog for operating the primary drive to prevent accidental engagement of the drive reversing mechanism.

It is still a further object of this invention to provide an actuation linkage interconnecting a drive reversing mechanism and a primary drive mechanism to prevent simultaneous actuation thereof which is durable in construction, inexpensive of manufacture, facile in assemblage, and simple and effective in use.

These and other objects, features and advantages are accomplished according to the instant invention by providing a control mechanism for a combine harvester wherein the engagement and disengagement of both the main drive and the auxiliary drive reversing mechanism can be controlled from a single lever. The control lever is pivotally mounted for rotational movement about a pair of perpendicularly disposed pivot axes, one of the pivot axes being rotatable about the other axis. A pair of clutch dogs corresponding respectively to the main drive and drive reverser are engageable with the control lever and separated by a plate-like barrier to prevent a disengagement of one clutch dog and the engagement of the other clutch dog except when the control lever is in a position to effect disengagement of both drive mechanisms. An overcenter linkage is provided with the drive reverser clutch dog to hold the control lever in an engaged position without further input from the operator.

BRIEF DESCRIPTION OF THE DRAWINGS

The advantages of this invention will become apparent under consideration of the following detailed disclosure of the invention, especially when taken in conjunction with the accompanying drawings wherein:

FIG. 5 is a cross-sectional view, showing the clutch mechanism, taken along lines 5—5 of FIG. 4;

FIG. 6 is a top plan view of the control box for operating the drive reversing mechanism taken along lines 6—6 of FIG. 2.

FIG. 7 is a cross-sectional view of the control box shown in FIG. 6, taken along lines 7—7, movement of the control lever being shown in phantom;

FIG. 8 is a cross-sectional view of the control box taken along lines 8—8 of FIG. 7, movement of the control lever and connected linkage being shown in phantom;

FIG. 9 is a cross-sectional view of the control box taken along lines 9—9 of FIG. 7 looking toward the top of the control box;

FIG. 11 is a generally vertical partial cross-sectional view of the control mechanism seen in FIG. 10, corresponding to lines 11—11 of FIG. 12 and depicting the main drive clutch actuating mechanism, the control mechanism being shown in the disengage position in phantom;

FIG. 12 is a cross-sectional view of the control mechanism seen in FIG. 10, corresponding to lines 12—12 of FIG. 11, the position of the control lever for engaging the drive reverser clutch mechanism being shown in phantom;

FIG. 13 is a partial cross-sectional view of the control mechanism seen in FIG. 10, corresponding to lines 13—13 in FIG. 12 and depicting the drive reverser clutch actuating mechanism, the position of the clutch dog and overcenter linkage upon engagement of the drive reverser clutch being shown in phantom.

DETAILED DESCRIPTION OF THE PREFERRED EMBODIMENT

Figure 1:
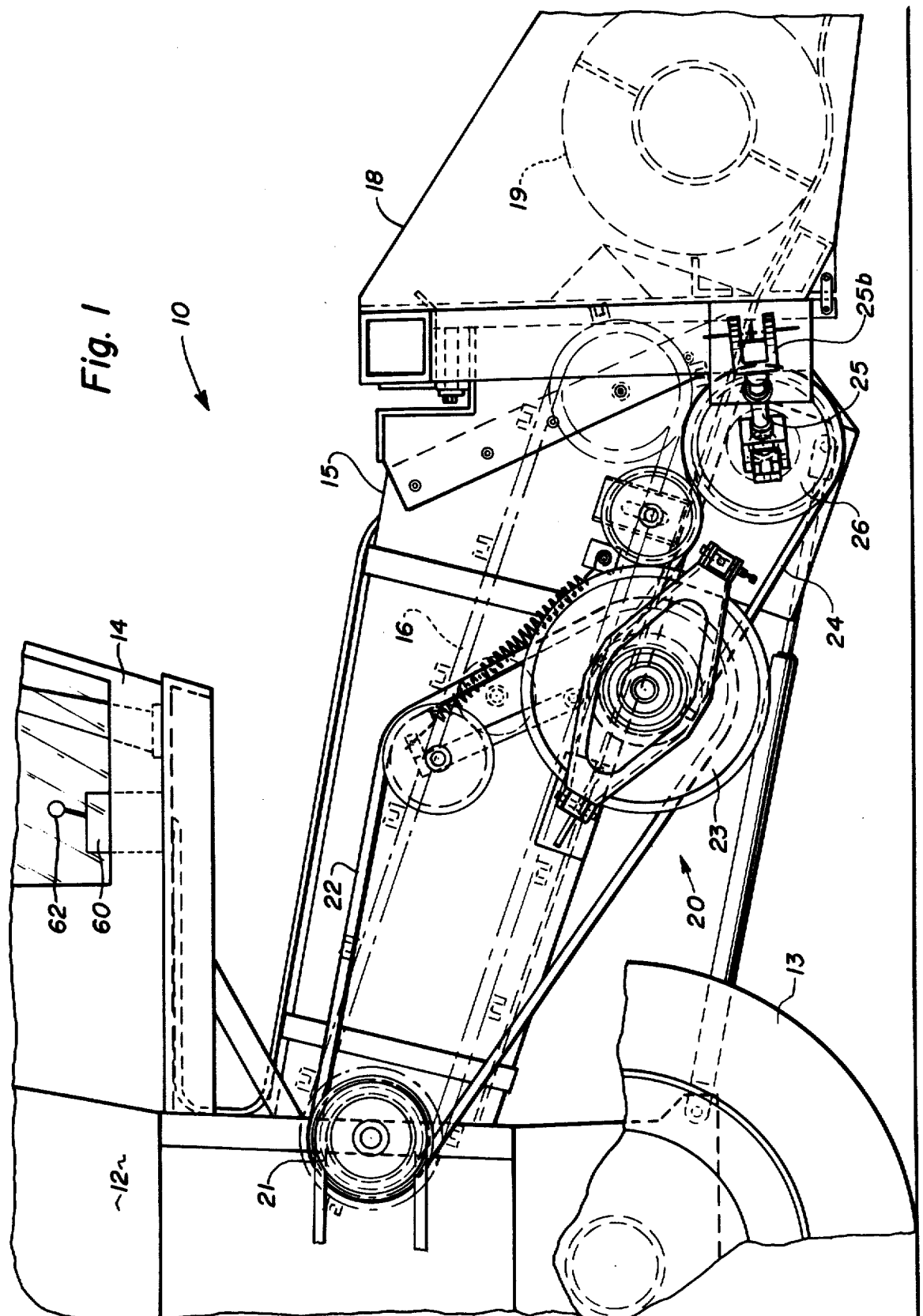
FIG. 1 is a partial right side elevational view of a crop harvesting machine, commonly referred to as a combine, incorporating the principles of the instant invention.

Referring now to the drawings, and particularly, to FIG. 1, a partial right side elevational view of a crop harvesting machine, commonly referred to as a combine, can be seen. Any left and right references are used as a matter of convenience and are determined by standing at the rear of the machine, facing the forward end, the direction of travel. The combine 10 includes a base unit 12 having a wheeled frame 13 mobilely supporting the combine 10 over a field. An operator's platform 14 is mounted on the base unit 12 in a conventional position to observe the harvesting operation taking forth below him. A feeder house 15 having a conventional chain and slat conveyor 16 rotatably housed therewithin is mounted on the base unit 12 to convey severed crop material to a conventional threshing mechanism (not shown) housed within the base unit 12. A crop harvesting header 18 is forwardly mounted on the feeder house 15 to gather crop material from the field and initiate the crop harvesting process. As is well known in the art, the header 18 can include a number of harvesting components, such as a cutterbar (not shown) for severing standing crop material, a reel (not shown) for conveying crop material rearwardly into the header and an auger 19 for consolidating the severed crop material and discharging it into the feeder house 15 for engagement by the conveyor 16.

Figure 2:
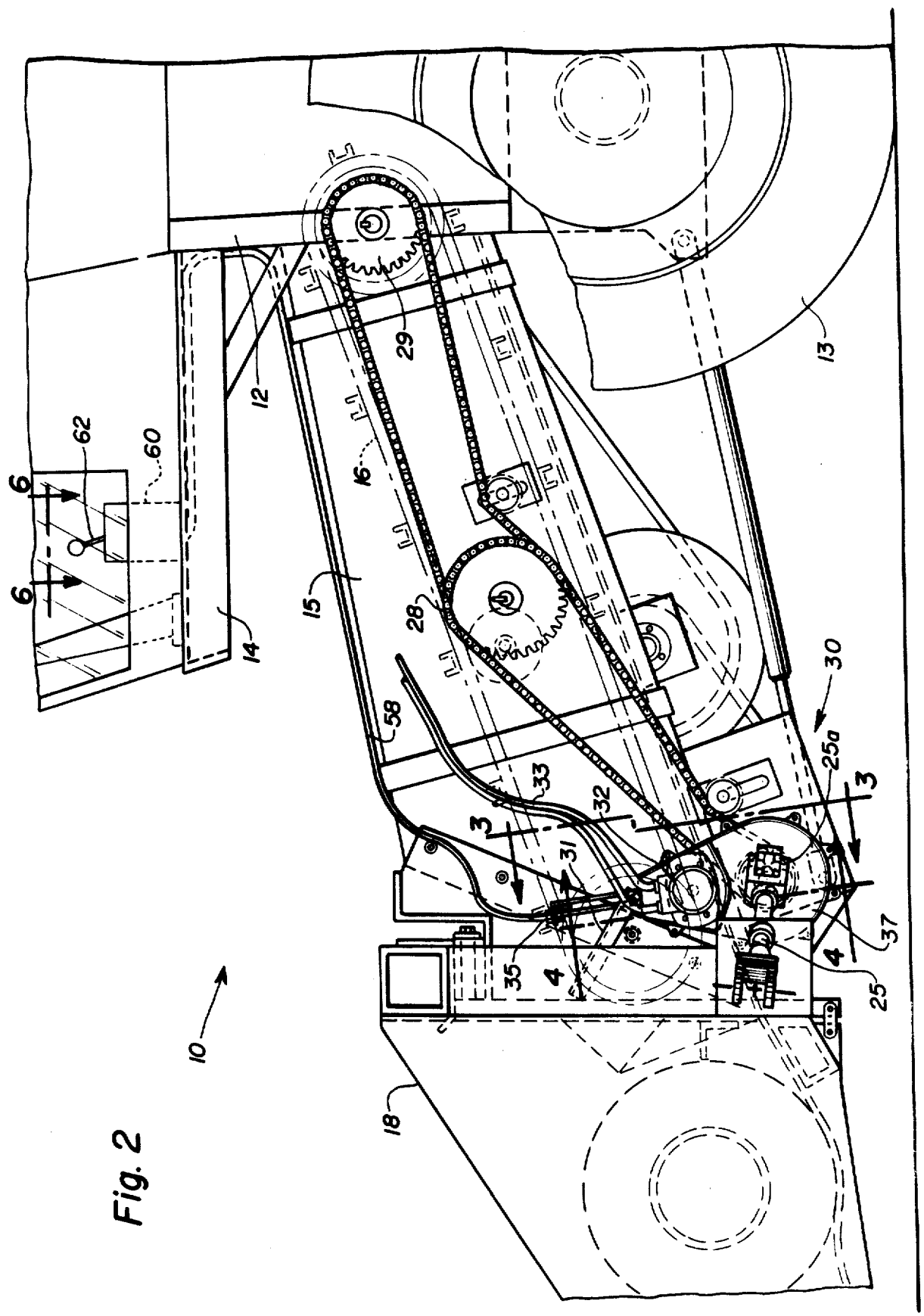
FIG. 2 is a partial left side elevational view of the combine seen in FIG. 1.
Figure 3:
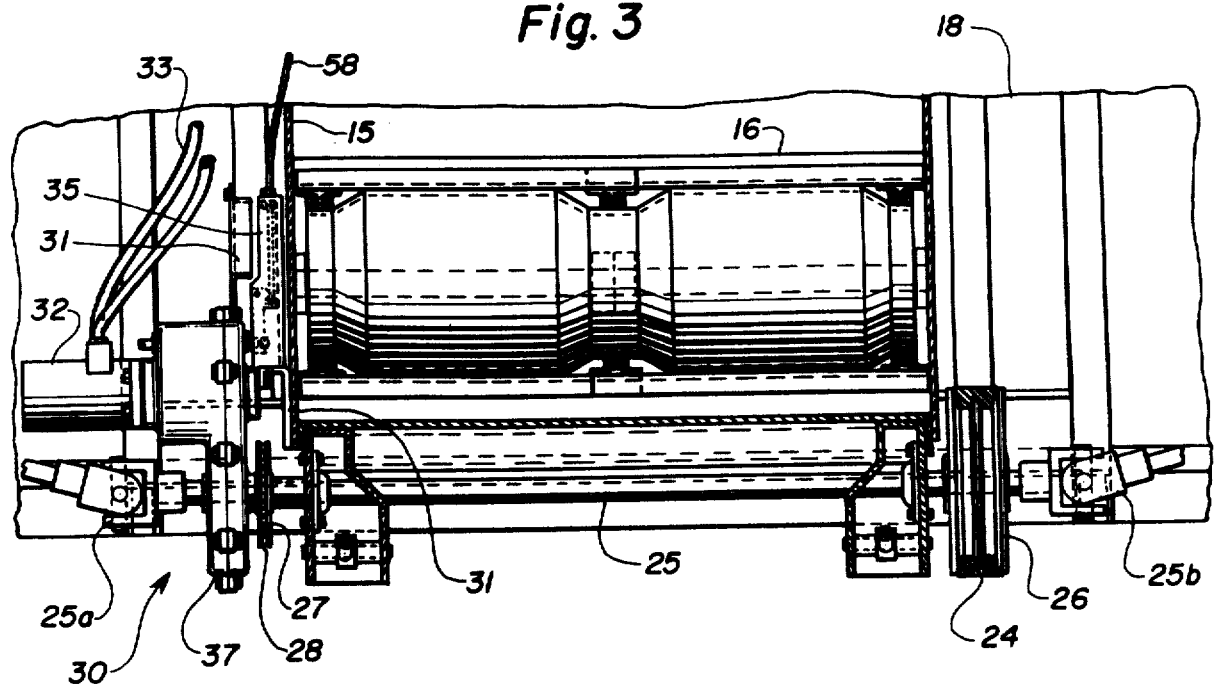
FIG. 3 is a partial cross-sectional view taken along lines 3—3 of FIG. 2, showing the backside of the drive reversing mechanism.

To drive the various header harvesting components and the feeder house conveyor 16, a drive line 20 is provided. As seen in FIG. 1, the base unit 12 is provided with a source of rotational power 21 operably driven by a power plant (not shown) supported on the frame 13. A first drive belt 22 transfers rotational power from the rotated pulley 21 to a vari-drive sheave 23 mounted on the right side of the feeder house 15. By controlling the effective diameter of the vary drive sheave 23, a variable speed output can be obtained from a generally fixed input speed. Accordingly, a second drive belt 24 transfers power from the vari-drive sheave 23 to a pulley 26 affixed to the header drive shaft 25. As can be seen in FIGS. 1–3, the header drive shaft 25 extends outwardly to both the left and right sides of the header 18 to appropriately drive header harvesting components.

As is best seen in FIGS. 2 and 3, the header drive shaft extends through or beneath the feeder house 15 to project beyond the left side of the feeder house 15. Mounted on the header drive shaft 25 is a sprocket 27 which serves to drive the conveyor 16 through the use of the endless chains 28 delivering rotational power to the sprocket 29 operatively connected to the conveyor 16. The header drive shaft 25 includes universal joints 25a and 25b disposed on either side of the feeder house 15 to accommodate misalignment of the angles of the drive shaft 25 in transferring rotational power to the header harvesting components. One skilled in the art will readily realize that the drive shaft 25 can be disassembled in a conventional manner at the location of these universal joints 25a, 25b.

Mounted to the left side of the feeder house by brackets 31 and splined onto the drive shaft 25 is the drive reversing mechanism 30, driven by a hydraulic motor 32 connectable by hoses 33 to a conventional source of hydraulic power mounted on the base unit 12. By disassembly of the header drive shaft 25 at the universal joint 25a, the reversing mechanism 30 can be selectively installed and/or removed from the combine 10 as a self-contained optional piece of equipment. As will be described in further detail below, the control linkage 35 for actuating and controlling the operation of the drive reversing mechanism 30 extends from the reversing mechanism 30 along the feeder house 15 to the operator's platform 14 and is connected to the control box 60.

Figure 4:
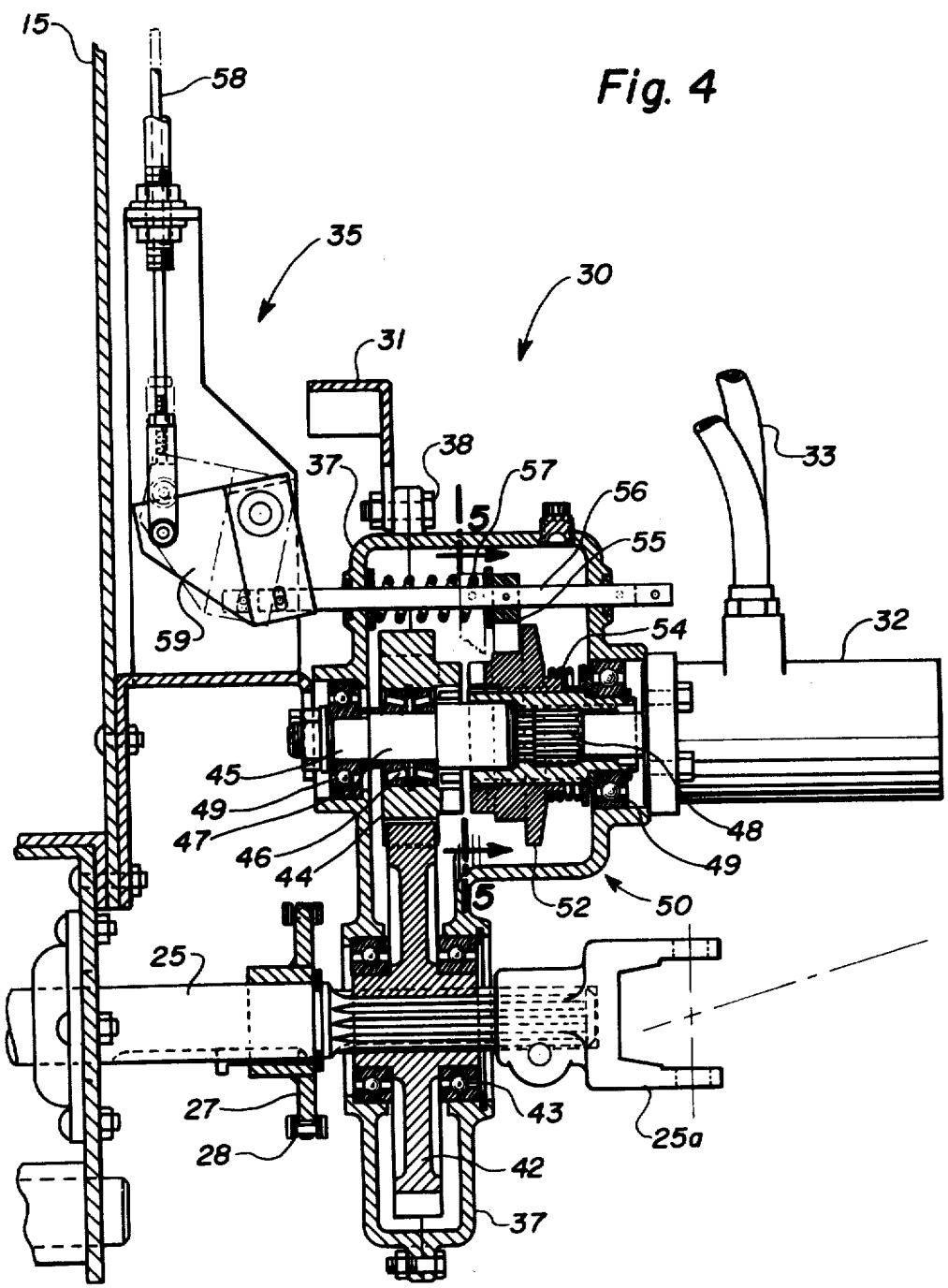
FIG. 4 is an enlarged cross-sectional view taken along lines 4—4 of FIG. 2 through the gearbox of the drive reversing mechanism.

As is best seen in the cross-sectional view of FIG. 4, the drive reversing mechanism 30 is generally contained within a gearbox 37 adapted for connection by bolts 38 to the mounting brackets 31. A first gear 42 is splined onto the drive shaft 25 and rotatably mounted within the casing 37 by bearings 43 so that the first gear 42 is rotatable with the header drive shaft 25, even during normal operation of the header harvesting components. A second gear 44 is rotatably mounted on a stub shaft 45 by bearings 46 for rotation independently of the stub shaft 45. The second gear 44 is positioned in intermeshing relationship with the first gear 42 so as to be rotatable with the header drive shaft 25 and the first gear 42 even during normal operation of the harvesting components. The stub shaft 45 includes a smooth portion 47 on which the second gear 44 is mounted and a splined portion 48. The stub shaft 45 is rotatably mounted within the gearbox 37 by bearings 49 and connected to the hydraulic motor 32 to form an operative extension of the driven shaft 34 of the motor 32 for powering the operation of the drive reversing mechanism 30.

Referring now to FIGS. 4 and 5, clutch 50 is mounted on the splined portion 48 of the stub shaft 45 to be rotatable therewith. The clutch 50 includes a jaw member 52 slidably movable on the splined portion 48 along the axis of the stub shaft 45 to be selectively engageable with the second gear 44, which is adapted for a driven engagement with the jaw member 52. An axially mounted spring 54 urges the jaw member 52 toward engagement with the second gear 44. Movement of the jaw member 52 toward the second gear 44 is controlled through the actuating linkage 35. A yoke 55 is engaged with the jaw member 52 and connected to a push rod 56 slidably received within the gear box 37. An actuating spring 57 urges the push rod 56 and yoke 55 in a direction to push the jaw member 52 away from the second gear 44. Since the actuating spring 57 is stronger than the clutch spring 54, the jaw member 52 will remain disengaged from the second gear 44 until the spring 57 is compressed through manipulation by an external force permitting the spring 54 to engage the jaw member 52 with the second gear 44. Movement of the yoke 55 and jaw member 52 is then controlled by the cable 58 extending into the operator's cab from a pivot member 59 interconnecting the cable 58 and the push rod 56 to translate movement of the cable 58 into a corresponding linear movement of the push rod 56, as shown in phantom in FIG. 4.

To prevent engagement of the drive reversing mechanism, i.e., preventing the clutch 50 from engaging the second gear 44, while the header drive shaft 25 is being driven from the primary drive 21 on the base unit 12, the actuating linkage 35 is interconnected with the control for engaging primary drive 21. As seen in FIGS. 6-9, the cable 58 is connected to a control box 60 in the operator's platform 14. The control box 60 is provided with a control lever 62 movable in a pattern defined by the slot 65. The control lever 62 is attached to a generally horizontally positioned pivot 71 mounted on a U-shaped bracket 72. The pivot 71 permits a movement of the lever 62 along one direction between quadrant 67 and quadrant 77 of the slot 65 as shown in phantom in FIG. 7. The U-shaped bracket 72 is swivelly mounted to the control box 60 by a swivel 73 to permit movement of the control lever 62 between notches 68,69,78,79 within quadrants 67 and 77 in a second direction perpendicular to the first direction, as shown in phantom in FIG. 8.

Movement of the lever 62 along the second direction within quadrant 67 of slot 65 controls the engagement of the primary drive 21 to power the normal rotation of the header drive shaft 25 and the operation of the various harvesting components. Positioning of the lever 62 into notch 68 rotates the bracket 72 about the swivel 73 and effects a pulling of control cable 75 attached to the tab 74 for conventionally operating a clutch (not shown) to engage the primary drive 21 and enable the transfer of rotational power to the header drive shaft 25. To engage the drive reversing mechanism 30, the lever 62 is pivotally moved in the first direction about the pivot 71 to position the lever 62 from quadrant 67 of slot 65 to quadrant 77, pulling on the actuating cable 58 to engage the clutch 50 with the second gear 44 within the gear casing 37 as is described above.

Once the control lever 62 has been moved to quadrant 77 of slot 65, the drive reversing mechanism 30 has been readied for operation. The clutch 50 is engaged with the second gear 44 and the primary drive 21 has been disengaged. Positioning of the lever 62 in quadrant 77 places the lever 62 within a forked bracket 81. A control rod 82 interconnects the forked bracket 81 and a conventional hydraulic valve (not shown) to control the flow of hydraulic fluid to the hydraulic motor 32. Movement of the lever 62 to notch 78 effects a driving of the motor 32 to rotate the drive shaft 25 in a normal direction, i.e., the same direction as when powered by the primary drive 21. Movement of the lever 62 to notch 79 reverses the direction of fluid flow to the motor 32 to power the rotation of the drive shaft in a reverse direction opposite to the normal direction of rotation, thereby powering the reverse operation of the header harvesting components and the feeder house conveyor 16.

Since the clutch 50 is engaged with the second gear 44 when the control lever 62 is moved to quadrant 77 of the slot 65, driving the reversing mechanism 30 in either forward or reverse directions is simply a matter of manipulating the hydraulic valve (not shown) to control the direction of fluid flow through the hydraulic motor 32. Accordingly, a "rocking" of the drive shaft 25, i.e., a switching back and forth of the direction of rotation of the drive shaft 25, to rock the conveyor 16 and the various header harvesting components to facilitate the dislodging of a plugged component, can be easily accomplished by moving the control lever 62 between notches 78 and 79.

As is noted above and best shown in FIG. 8, a positioning of the control lever 62 from notch 68 to notch 69 permits the cable 75 to go slack and disengage the primary drive 21 in a conventional manner. The cable 75 is situated such that it is necessary to move the control lever 62 as far as notch 68 to cause the primary drive 21 to be engaged. With respect to the amount of pull applied to cable 75, movement of the control lever 62 between notches 78 and 79 leaves the cable 75 in a slack condition and does not effect an actuation of the primary drive 21. Hence, the primary drive 21 cannot be actuated while the drive reversing mechanism 30 is engaged and/or operated.

Referring now to FIGS. 10-13, an alternative embodiment of a control mechanism for operating the drive reversing mechanism 30 and the primary drive 21 to the header drive shaft 25 can be seen. The combine 10 includes the alternate control mechanism 90 which is operatively connected to the drive reversing mechanism 30 via the cable 58 and to a solenoid valve 92 by wires 93. The solenoid valve 92 is in operative fluid flow communication with the hydraulic motor 32 via hoses 33 to control the direction of flow of fluid to the hydraulic motor 32 and in operative fluid flow communication with a conventional source of hydraulic fluid under pressure via hoses 94.

The structural details of the control mechanism 90 is best seen in FIGS. 11-13. The control lever 100 is connected to a pivot assembly 102 mounted in a housing 98 affixed to the back wall 99 of the operator's platform 14 to permit rotative movement of the lever 100 about a generally horizontal axis 105 and about a second pivot axis 107 that is perpendicular to the horizontal axis 105 and rotatable thereabout with the control lever 100. Also, rotatable about the horizontal axis 105 are a pair of clutch dogs 110,115. As best seen in FIGS. 11 and 12, the main drive clutch dog 110 is comprised of a slotted L-shaped bracket 111 welded to a bushing 112 mounted for rotation about the horizontal axis 105 and a generally oppositely extending mounting tab 113 welded to the bushing 112. A connecting rod 114 interconnects the mounting tab 113 and the main drive clutch (not shown) in a conventional manner to affect actuation thereof upon rotation of the main drive clutch dog 110 about the horizontal pivot 105 as will be described in further detail below.

As is best seen in FIGS. 12 and 13, the drive reverser clutch dog 115 also comprises a forked bracket 116 weld d to a bushing 117 mounted for rotation about the horizontal axis 105 and a mounting tab 118 welded to the bushing 117 for rotation therewith. Pivotally connected to the mounting tab 118 is an overcenter link 120 having a notch 122 formed therein. The cable 58 is connected to the overcenter link 120. To prevent accidental actuation of the drive reverser while the main drive is still engaged, a plate-like barrier 124 is affixed to the back wall 99 of the operator's platform 14 and positioned between the clutch dogs 110,115 to prevent movement of the control lever 100 from one clutch dog to the other clutch dog except when the control lever 100 is at its downwardmost position.

The control lever 100 is provided with a rocker switch 125 mounted at the end 101 thereof for convenient operation by the operator. The wires 93 interconnect the rocker switch 125 with a source of electrical power (not shown) and the solenoid valve 92. As will be described in greater detail below, manipulation of the rocker switch 125 actuates the solenoid valve 92 to control the direction of hydraulic fluid to the hydraulic motor 32. To prevent accidental actuation of the drive reversing mechanism 30, the control lever 100 is biased by a leaf spring 127 interengaged between the lever 100 and a circular disc 128 forming a part of the pivot assembly 102, urging the lever 100 in a clockwise direction about the second pivot axis 107 when viewed from above, as in FIG. 12.

Figure 14:
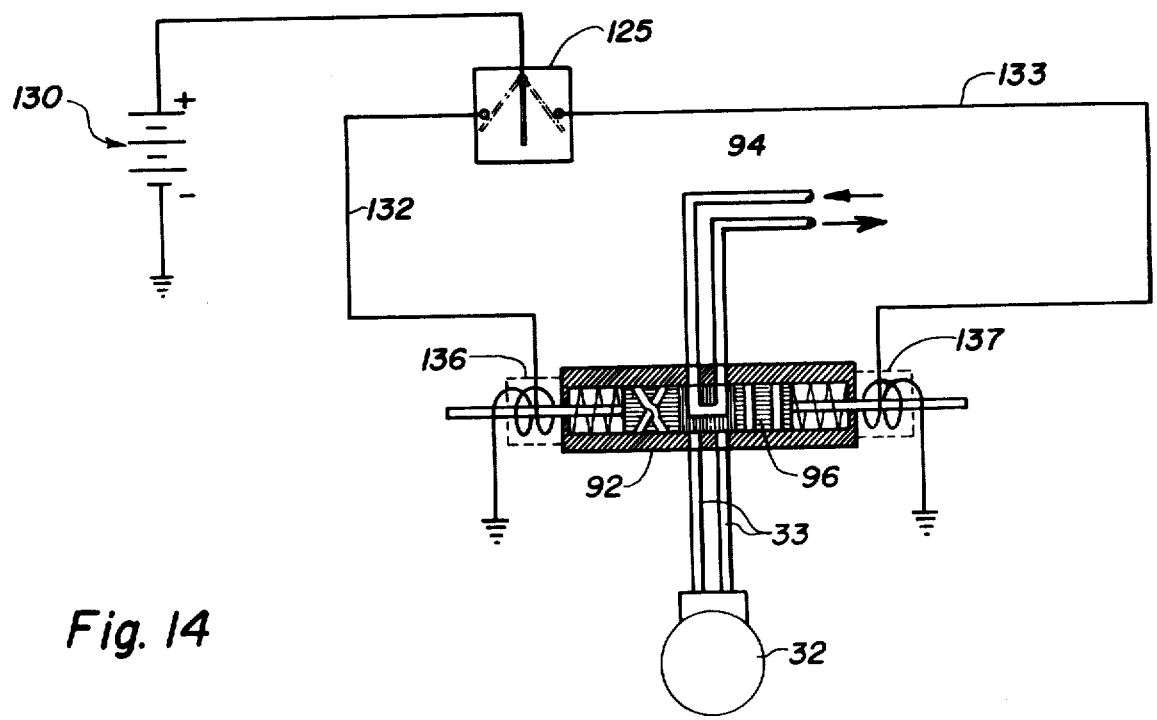
FIG. 14 is a diagrammatic view of the electro-hydraulic circuitry for the control of the direction of operation of the drive reversing mechanism.

Referring now to FIG. 14, a diagrammatic view of the operation of the solenoid valve 92 can be seen. The rocker switch 125 receives electrical power from a primary source 130, such as a battery, and is operable to switch the direction of current alternatively through lines 132 and 133 to opposingly positioned solenoids 136,137. Selective energizing of one of the solenoids 136,137 affects a corresponding linear movement of the valve spool 96 to control the direction of hydraulic fluid from hoses 94 through hoses 33 and, thereby, control the direction of rotation of the hydraulic motor 32.

Figure 10:
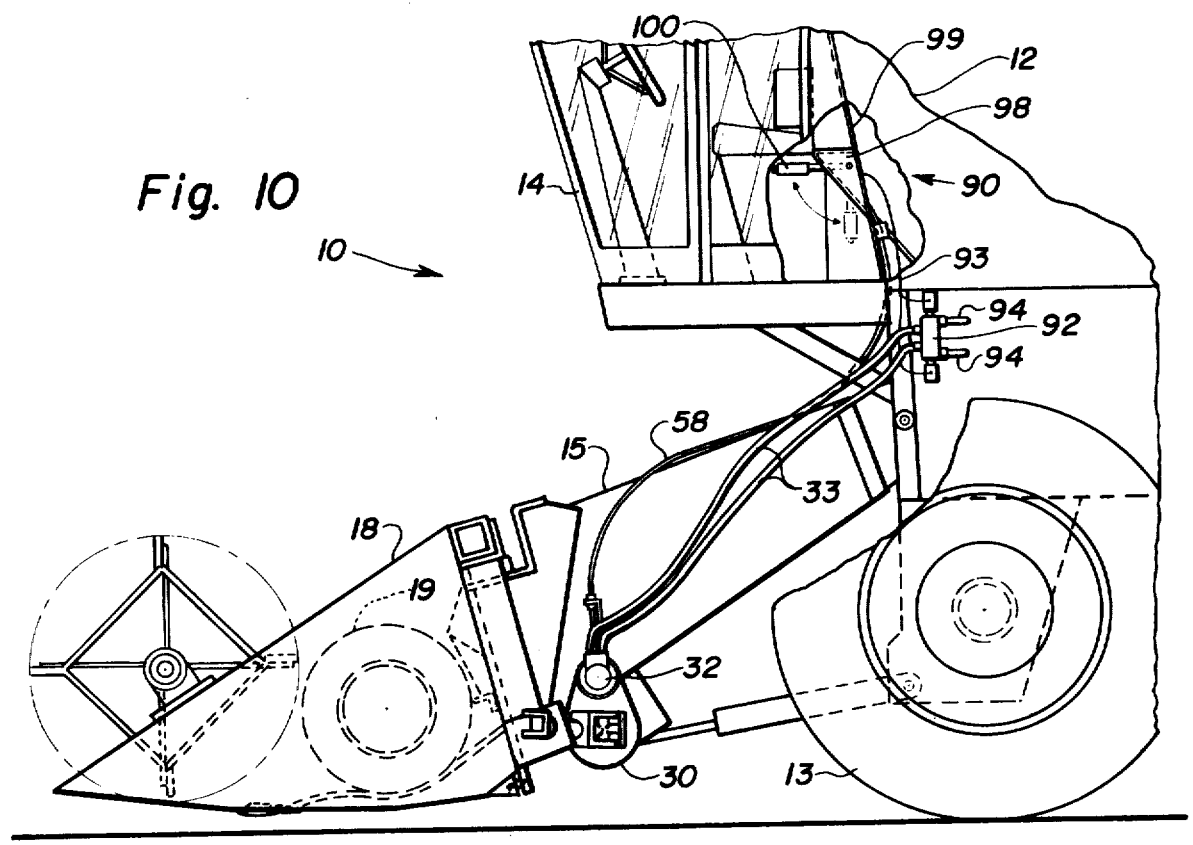
FIG. 10 is a partial side elevational view of a combine corresponding to the view seen in FIG. 1, but incorporating an alternative drive control mechanism.

As will be clear from the description below, both the main drive and the reverser drive will be disengaged when the control lever is moved into its downwardmost position as seen in phantom in FIG. 10. The leaf spring 127 biases the control lever 100 about the second pivot axis 107 so that the lever 100 is urged into engagement with the main drive clutch dog 110. A rotation of the control lever 100 about the horizontal pivot axis 105 to its upwardmost position as seen in solid lines in FIG. 10 affects a rotation of the main drive clutch dog 110 to move the connecting rod 114 from a disengaging position, shown in phantom in FIG. 11, to an engaging position seen in solid lines in FIG. 11. In this position, normal operation of the header 18 and feeder house 15 can be affected. It should be noted that, as is best seen in FIG. 11, the control lever 100 cannot be moved out of engagement with the main drive clutch dog 110 because of the location of the gate 124 while the control lever 100 is in any position other than its downwardmost position.

Should it be desirable to engage the drive reversing mechanism 30, the control lever 100 must be moved to its downwardmost position seen in solid lines in FIG. 13 and then rotated about the second pivot axis 107, overcoming the biasing force of the leaf spring 127, to a position corresponding to the position shown in phantom in FIG. 12. This manipulation of the control lever 100 affects a displacement of the lever 100 from the main drive clutch dog 110 to the drive reverser clutch dog 115. A subsequent movement of the control lever 100 into its uppermost position causes a rotation of the reverser clutch dog 115 about the horizontal pivot axis 105 to pull on the cable 58 and actuate the drive reversing mechanism 30 as described above.

Rotation of the reverser clutch dog 115 affects a corresponding rotation of the mounting tab 118 and a movement of the overcenter link 120 to a position shown in phantom in FIG. 13, such that the notch 122 is positioned around the horizontal pivot axis 105. Consequently, the line of force exerted by the tension on the cable 58 passes overcenter of the pivot axis 105 and is thereby operable to retain the control lever 100 in its uppermost position without further effort by the operator. Once the drive reversing mechanism 30 has been engaged through manipulation of the control lever 100, an appropriate manipulation of the rocker switch 125 on the control lever 100 controls the operation of the hydraulic motor 32 to drive the feeder house conveyor 16 and header 18 in either a forward or reverse direction as described above.

Since the drive reversing mechanism 30 is essentially a self-contained unit, the mechanism 30 can be installed as an option to almost any crop harvesting machine. Disconnection of the drive shaft 25 at the universal joint 25a permits the casing 37 to be slid onto the drive shaft 25 and attached to brackets 31 to support the mechanism 30 from the feeder house 15. After appropriate connection of the hydraulic hoses 33 and the actuating linkage 35 and a reconnection of the universal joint 25a, the drive reversing mechanism 30 is ready for operation. Movement of the control lever 62 to affect a pulling on the cable 58 permits the jaw member 52 to slide along the axis of the stub shaft 45 into engagement with the second gear 44. A powered rotation of the stub shaft 45 by the motor 32 causes the jaw member 52 to rotate, transferring rotational power to the second gear 44, which in turn powers the rotation of the first gear 42 and the header drive shaft 25 splined thereto. Since the conveyor 16 is operatively powered from sprocket 27 mounted on the drive shaft 25, the drive reversing mechanism 30 will also power the reversing of the movement of the conveyor 16 to discharge crop material therein back toward the header 18. One skilled in the art will readily realize the applicability of this self-contained drive reversing mechanism to other types of crop harvesting machinery.

One skilled in the art will further realize that this drive reversing mechanism can be used to unplug the threshing mechanism if the drive train from the feeder house back to the threshing mechanism is unbroken. Generally, the primary drive is inoperative to drive any harvesting equipment, including the thresher, if the thresher becomes plugged. This drive reversing mechanism can not only be used to unplug the thresher but can also be used to slowly inch a slug of crop into the threshing unit. Furthermore, the slow speed of the hydraulic drive of the drive reversing mechanism can be used to aid in the installation of the feeder house conveyor by slowly feeding the chain around the sprockets. One skilled in the art will also realize that a chain drive could be utilized in the gear box 37 in the place of intermeshing gears 42,44 as operational equivalents thereof. The following claims are specifically intended to cover such equivalent structure.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a combine harvester having a mobile frame adapted for movement across a field; threshing means mounted on said frame to thresh crop material fed thereto; a header forwardly supported from said frame to gather crop material from the field, said header having driven harvesting components mounted thereon to initiate a crop harvesting process; a feeder house operatively interconnecting said header and said threshing means to convey crop material from said header to said threshing means; drive means for drivingly powering the normal operation of said threshing means, said feeder house and said header harvesting components, said drive means being disengageable to stop the driving of said feeder house and header harvesting components; and drive reversing means operatively connected to said drive means to provide a driving power to reverse the operation of said feeder house and said header harvesting components after said drive means has been disengaged, said drive reversing means including a clutch for selectively engaging and disengaging the operation of said drive reversing means, an improved drive reverser actuating mechanism comprising:

a housing supporting a first pivot defining a first pivot axis;

a pivot assembly rotatably mounted on said first pivot for rotative movement about said first pivot axis, said pivot assembly carrying a second pivot defining a second pivot axis substantially normal to and movable around said first pivot axis;

a control lever connected to said second pivot so as to be pivotable about both said first and second pivot axes, said control lever being movable between a disengage position and an engage position during pivotal movement about said first pivot axis;

a main drive clutch dog rotatably mounted on said first pivot for selective engagement by said control lever, said main drive clutch dog being operable to control the engagement and disengagement of said main drive when pivotally moved around said first pivot axis by said control lever;

a drive reverser clutch dog rotatably mounted on said first pivot in spaced relation to said main drive clutch dog for selective engagement by said control lever, said drive reverser clutch dog being operatively connected to said drive reverser clutch to control engagement and disengagement thereof when pivotally moved around said first pivot axis by said control lever; and a gate fixed relative to said housing and positioned between said main drive clutch dog and said drive reverser clutch dog to prevent a movement of said control lever from one said clutch dog to the other said clutch dog except when said control lever is in said disengage position wherein both said drive means and said drive reversing means are disengaged.

2. The combine harvester of claim 1 wherein said control lever is movable from one of said clutch dogs to the other of said clutch dogs when in said disengage position by a pivotal movement thereof about said second pivot axis.

3. The combine harvester of claim 2 wherein said drive reverser clutch dog includes an overcenter link connected to a mounting tab, said overcenter link being connected to said drive reversing clutch by a cable, said overcenter link being positioned such that the tension exerted by said cable when said control lever is engaged with said drive reverser clutch dog and is moved into said engage position passes overcenter of said first pivot axis to hold said control lever in said engage position.

4. The combine harvester of claim 3 wherein said drive reversing means is driven by a hydraulic motor, the direction of flow of hydraulic fluid to sid hydraulic motor being controlled by a solenoid valve electrically operated from a switch mounted in said control lever.

5. The combine harvester of claim 3 wherein said control lever is biased toward engagement with said main drive clutch dog.

6. The combine harvester of claim 5 wherein said pivot assembly includes a generally circular disc positioned proximate to said control lever, said control lever being biased by a leaf spring affixed to said control lever on one side of said second pivot axis and slidingly engaged with said disc on the opposing side of said second pivot axis.

7. The combine harvester of claim 3 wherein each said clutch dog includes a forked L-shaped bracket defining a notch therein for engagement of said control lever, each said forked bracket being affixed to a bushing coaxially mounted on said first pivot.

* * * * *